Sept. 4, 1956 B. COOPER ET AL 2,761,928
TREADLE AND TREADLE FRAME
Filed Oct. 16, 1953 2 Sheets-Sheet 1
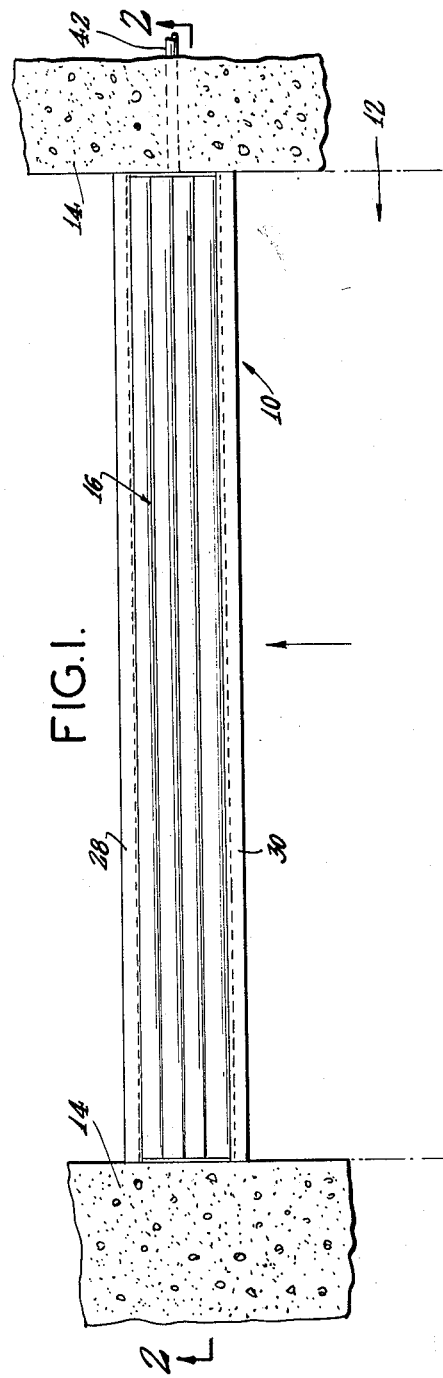
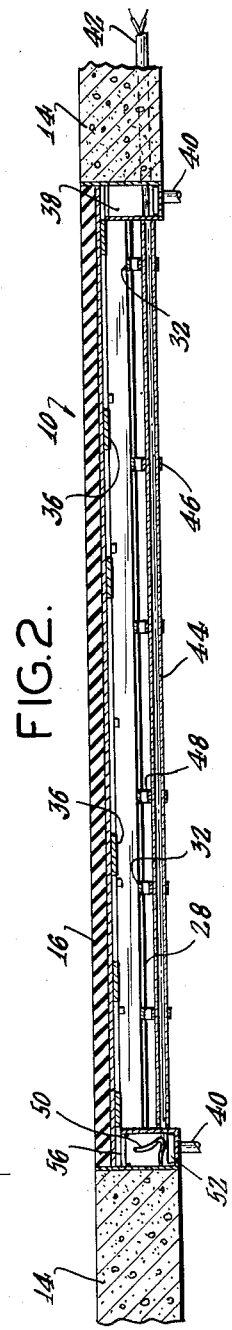
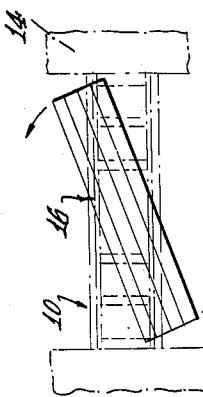
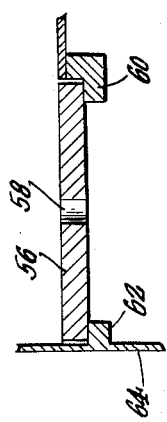
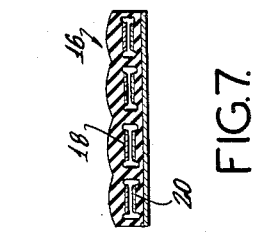
INVENTORS.
BENJAMIN COOPER
MURRAY CHARET
BY
*J.B. Eelshn*
ATTORNEY.

Sept. 4, 1956
B. COOPER ET AL
2,761,928
TREADLE AND TREADLE FRAME
Filed Oct. 16, 1953
2 Sheets-Sheet 2
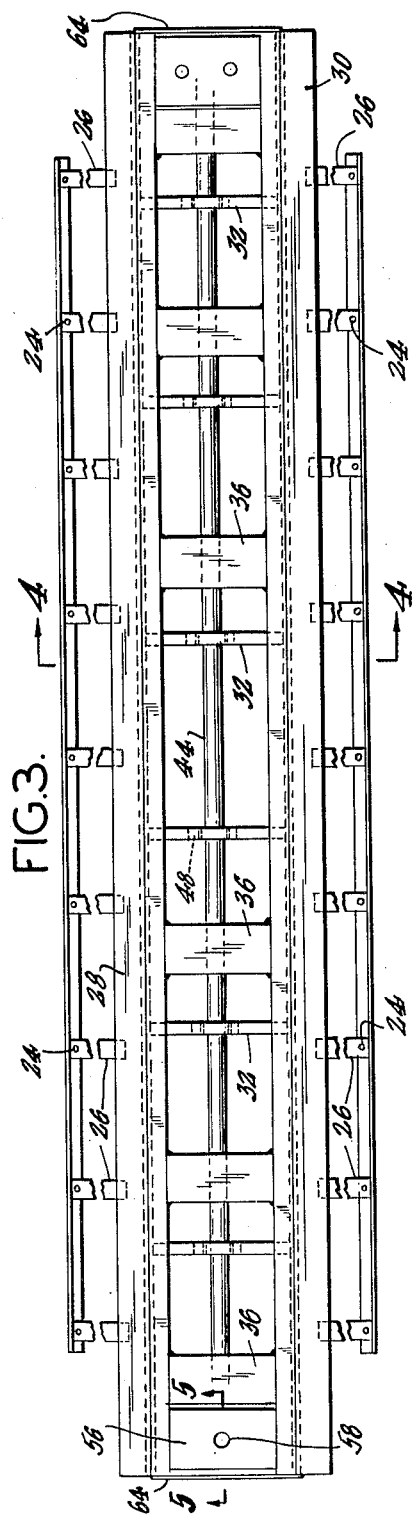
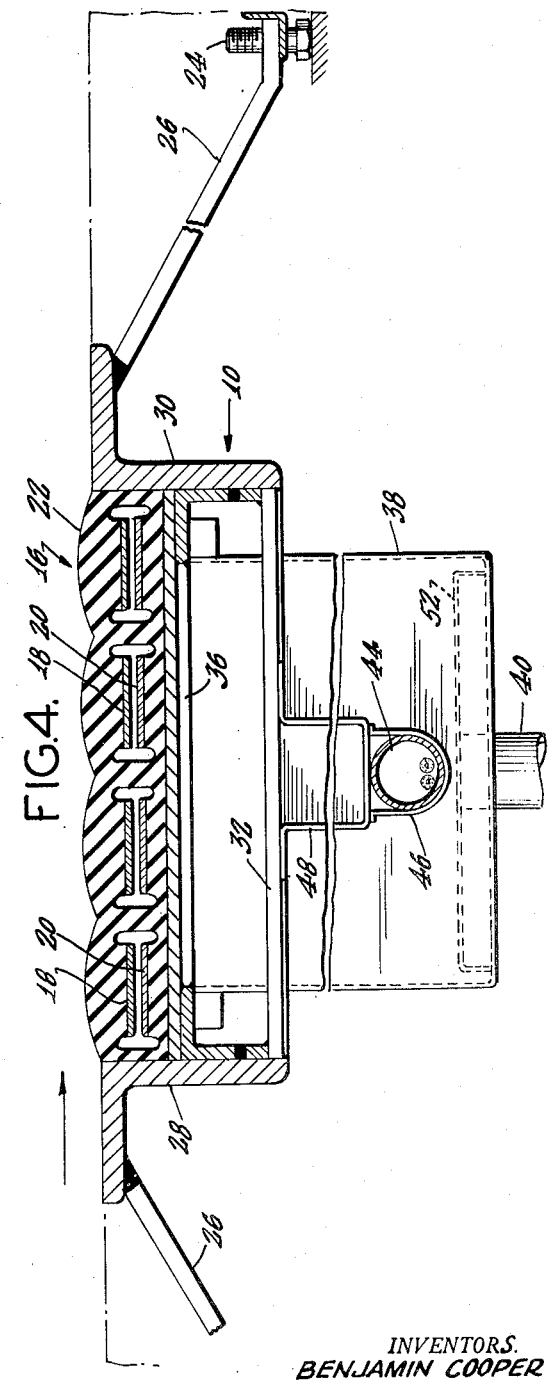
INVENTORS.
BENJAMIN COOPER
MURRAY CHARET
BY
ATTORNEY.

United States Patent Office 2,761,928
Patented Sept. 4, 1956

2,761,928

TREADLE AND TREADLE FRAME

Benjamin Cooper and Murray Charet, Brooklyn, N. Y.; said Charet assignor to said Cooper Application October 16, 1953, Serial No. 386,523

3 Claims. (Cl. 200—86)

This invention relates generally to treadles and more particularly to a novel treadle frame wherein a treadle mounted therein may be alternately reversed with respect to said frame.

Treadles have been generally utilized for the counting of vehicular traffic and are conventionally disposed transversely on a roadway whereby vehicles traversing the roadway must roll over the treadle. The treadle generally comprises a plurality of spaced contact strips that are sequentially closed by the pressure of the wheels of a vehicle rolling thereover. Further, the treadles are arranged to actuate counters thereby providing a record of the passage of vehicles through a predetermined area of roadway.

Such a predetermined area of roadway may be a toll booth installation whereby vehicles must pass a toll booth and the toll paid by the vehicle driver before he may gain access to the toll facilities.

Heretofore treadles that have been installed at such an installation were subject to a constant repetitive wear as a result of the vehicle drivers rolling over substantially the same area of the treadle. This factor results from the average vehicle driver driving his vehicle as close to the toll booth as possible to facilitate the payment of the tolls through the window of the vehicle. The treadles generally utilized at these installations are of sufficient length to extend across the lane whereby each vehicle wheel must roll over the treadle. However, the tendency of the vehicle drivers to approach the toll booth as closely as possible results in a greater percentage of wear on the predetermined areas of the treadle than on the remaining areas of the treadle. It may be stated at this time that the treadle generally consists of a rubber envelope having the contacts imbedded therein. As a result of this continued general practice these treadles have to be replaced as soon as the rubber envelope showed signs of possible malfunctioning as a result of the wear. The wear, while being localized on the treadle surface, generally necessitates a complete replacement of the treadle.

The present invention provides a unique treadle frame and treadle structure whereby the treadle may be reversed in the frame and the worn spots of the treadle thereby disposed in locations that are not subject to wear. Conversely, the unworn portions are disposed in the position that receives the greatest usage.

Therefore, one of the principal objects of this invention resides in the provision of a treadle frame, adapted to receive a treadle therein having means to detachably secure such treadle in alternate positions.

Another object of the invention resides in the provision of a treadle that may be disposed in the aforesaid treadle frame in alternate positions.

A further object of the invention resides in the provision of means for adjustably levelling the frame of the treadle whereby a treadle disposed therein will be correctly positioned for actuation by the wheels of a vehicle relative to the plane of the roadway in which the treadle frame is placed.

Yet another object is to provide electric conduit means that interconnect the respective ends of the treadle frame whereby the electrical cables which connect the treadle contacts to the respective counters may be positioned at either end of the treadle when said treadle is disposed in alternative positions in the treadle frame.

Other ancillary objects will be, in part, hereinafter described and will be, in part, hereinafter apparent.

In the drawings:

Figure 1 is a plan view of a treadle frame imbedded in the lane of a roadway with a treadle disposed therein.

Figure 2 is a cross-section taken along line 2—2 of Figure 1, illustrating the symmetrical relationship of the conduit relative to the treadle frame.

Figure 3 is a plan elevation of the treadle frame with the treadle omitted to more fully illustrate the construction details thereof.

Figure 4 is a cross-section taken along line 4—4 of Figure 3.

Figure 5 is a detailed cross-section taken along line 5—5 of Figure 3, illustrating the end cover plate of the unused electrical junction box provided in the treadle frame.

Figure 6 shows the transposing of the treadle unit 180° in order to even out wear.

Figure 7 is a cross-section of the replaceable treadle unit.

Referring to the drawings in detail 10 generally designates a treadle frame that is disposed transversally across a lane 12 through which vehicular traffic must pass. Lane 12 is defined by spaced concrete aprons 14, which guide the vehicular traffic in the lane. Conventionally lane 12 is of such width to permit passage of the widest commercial vehicles and is approximately ten feet in width. The general width of the passenger vehicle is four feet eight inches when measured from tire to tire, therefore, it is readily evident that only certain sections of the treadle will be engaged by the wheels of passenger vehicles which may roll across the treadle. Imbedded in frame 10 in such a manner is the treadle unit 16 whereby the surface of the unit 16 is substantially in the same plane as the surface of the roadway of the lane 12.

As shown in Figure 4, treadle unit 16 consists of a plurality of contact strips 18 and 20 respectively, spaced vertically one from the other and sealed within a rubber envelope designated as 22. The contact strips 18 and 20 are arranged to engage each other upon pressure being exerted on the upper surface of the rubber envelope 22. This pressure is exerted by the wheels of a vehicle rolling over the treadle. In order to insure actuation at the contact strips by the vehicle wheel, it has been found that the treadle envelope 22 be disposed on an angular plane whereby the first portion of the treadle subject to engagement by a vehicle is lower than the last portion of the treadle subject to actuation by the vehicle. The direction of the arrow in Figure 4 represents the general direction of traffic with respect to the treadle position.

Means are provided to adjust the angular position of treadle frame 10 to the surface of the roadway and to this end there are provided a plurality of adjusting bolts 24. Bolts 24 are adapted to be threadedly engaged in suitable apertures in supporting extensions 26 of frame 10 whereby the bolt head is disposed below the extensions 26. The bolts 24 may be rotated to raise one side of the treadle frame 10 slightly higher than the other side, thereby angularly positioning the treadle 16 as required. The treadle frame generally comprises a pair of angle members 28 and 30 respectively, spaced one from the other and secured in parallel relation by means of a plurality of spaced plates 32 at the base thereof. The extensions 26 angularly extend downwardly from the horizontal arms of the respective angle members 28 and 30 and are secured thereto by welding or the like. Further, there is provided a plurality of supporting strips 36 which are channel forming members disposed between the respective angle members 28 and 30. Supporting strips 36 are disposed to receive the rubber envelope 22 thereon and support said envelope in correctly defined relation with the upper surface of the roadway. The space below strip members 36 is provided for the purpose of draining any water that may seep under the treadle unit 16. Disposed at the respective ends of the frame 10 are a pair of wells 38 in which the water may drain from the space defined by the plates 32 of the strips 36. A run-off gutter 40 is provided to drain water out of the wells 38. Each of the wells 38 performs a second function in the capacity of an electrical junction box where the connection wires between the contact strips 18 and 20 pass through and into the interconnecting conduit 42, Figure 2, which carry said wires to the remote counting apparatus, not shown. Interconnecting the respective wells 38 is a conduit 44, secured by brackets 46 to a plurality of brackets 48 that are in turn secured to the undersides of the plates 32. Conduit 44 provides for the support of the connecting cable 50 when the treadle is disposed in an alternate position to that shown in Figures 1 and 2 wherein the connection with the contact strips 18 and 20 is positioned in the right hand well 38. The cable 50 is of the water proof type and to prevent the slack from lying in water that may accumulate at the bottom of the well 38, a stand off plate 52 is provided in each well to support the slack cable. Stand off plate 52 is perforated to facilitate the run off of any water that may enter the respective wells. The particular well that is not being utilized for the electrical connection is provided with a cover plate 56 having a central aperture 58 therein to facilitate the removal thereof. Obviously, the cover plate 56 may be disposed on the opposing well 38 when the treadle is reversed and the electrical connections are likewise reversed. Cover plate 56 is supported at one end on angle member 60 secured to one of the cross-strips 36 so as to provide a flush surface therewith and is supported at its opposite margin by means of a recessed block 62 affixed to an end plate 64.

Thus, it is evident that the rubber envelope 16 may be removed after having been utilized for a considerable period of time and rotated in the same plane one hundred eighty degrees and replaced in the treadle frame with a minimum of effort. The portions of the envelope that were subject to wear by the vehicular tires have now been disposed laterally of their initial position and the repetitive vehicular travel rolls over the portions of the treadle envelope that were not previously subject to continued wear.

The unique construction of the present treadle frame facilitates the transposing of the envelope 16 while permitting the connecting wires to be concurrently moved without requiring the disconnection thereof.

Thus, it is apparent that there has been provided a device that is both simple and novel, in which the several objects of this invention are achieved and which is adapted to meet the conditions of practical use.

As embodiments might be made of the above invention, and as various changes may be made in the embodiment set forth, it is to be understood that all matter herein set forth or shown in the accompanying drawings is to be interpreted as illustrative and not in a limiting sense.

The invention claimed is:

1. In combination, a treadle frame comprising a pair of spaced parallel longitudinal side members, bottom members interconnecting said side members at the lower margins thereof, intermediate members interconnecting said side members on a plane above said bottom members and below the upper margins of said side members and having therein treadle aligning means, a treadle having a complemental alignment means thereon adapted to be positioned between said side members and on said intermediate members, and said treadle alignment means selectively co-operable with said aligning means to position said treadle in said treadle frame in selected alternate positions, a leveling member extending outwardly from each respective side member, and adjusting means cooperable with each of said leveling members to adjust the plane of the upper margins of said side members.

2. In combination, a treadle frame comprising a pair of spaced parallel longitudinal side members, bottom members interconnecting said side members at the lower margins thereof, intermediate members interconnecting said side members on a plane above said bottom members and below the upper margins of said side members and having therein treadle aligning means, a pair of wells adjacent the ends of said side members and projecting downwardly therefrom, a conduit interconnecting said respective wells, a treadle having complemental aligning means thereon adapted to be positioned between said side members and supported on said intermediate members, electric connecting means extending from said treadle and adapted to be positioned in said conduit through either of said wells, and said treadle alignment means selectively co-operable with said aligning means to position said treadle in said treadle frame in selected alternate positions.

3. In combination, a treadle frame, comprising a pair of parallel spaced longitudinal side members between which a treadle may be placed, a plurality of bottom members interconnecting said pair of side members at the lower margins thereof, a plurality of intermediate members interconnecting said side members on a plane above said bottom members and below the upper margins of said side members, a pair of angularly extending levelling members affixed to and projecting downwardly from the respective side members, adjusting means co-operable with said levelling members to adjust the plane of the upper margins of said side members, wells adjacent the respective ends of said side members and projecting therebelow, a conduit interconnecting said respective wells, a treadle having aligning means thereon adapted to be positioned between said side members and supported on said bottom members, frame alignment means and said frame aligning means selectively co-operable with said treadle aligning means to position said treadle in said treadle frame in a selected alternate position.

References Cited in the file of this patent
UNITED STATES PATENTS

| | | |
|---|---|---|
| 2,244,933 | Armstrong | June 10, 1941 |
| 2,346,009 | Conklin | Apr. 4, 1944 |
| 2,525,824 | Nagel | Oct. 17, 1950 |